(12) United States Patent
Cherubini et al.

(10) Patent No.: US 11,934,946 B2
(45) Date of Patent: Mar. 19, 2024

(54) LEARNING AND RECALL IN SPIKING NEURAL NETWORKS

(71) Applicant: International Business Machines Corporation, Armonk, NY (US)

(72) Inventors: Giovanni Cherubini, Rueschlikon (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1175 days.

(21) Appl. No.: 16/529,759

(22) Filed: Aug. 1, 2019

(65) Prior Publication Data

US 2021/0034962 A1  Feb. 4, 2021

(51) Int. Cl.
*G06N 3/08* (2023.01)
*G06N 3/049* (2023.01)

(52) U.S. Cl.
CPC .............. *G06N 3/08* (2013.01); *G06N 3/049* (2013.01)

(58) Field of Classification Search
CPC ........ G06N 3/049; G06N 3/044; G06N 20/00; G06N 3/12; G06N 7/01
See application file for complete search history.

(56) References Cited

U.S. PATENT DOCUMENTS

| | | | |
|---|---|---|---|
| 10,346,739 B1 * | 7/2019 | Dockendorf | G06N 3/08 |
| 2014/0351190 A1 | 11/2014 | Levin et al. | |
| 2016/0155050 A1 | 6/2016 | Buibas et al. | |
| 2016/0275395 A1 * | 9/2016 | Amir | G06N 3/105 |
| 2019/0034083 A1 | 1/2019 | Cherubini et al. | |
| 2019/0042915 A1 | 2/2019 | Akin et al. | |
| 2019/0243546 A1 | 8/2019 | Cherubini et al. | |

FOREIGN PATENT DOCUMENTS

| | | |
|---|---|---|
| JP | H10294875 A | 4/1997 |
| WO | 2019142061 A1 | 7/2019 |

OTHER PUBLICATIONS

Brea et al., Matching Recall and Storage in Sequence Learning with Spiking Neural Networks, 2013, The Journal of Neuroscience, Jun. 5, 2013, pp. 9565-9575 (Year: 2013).*

(Continued)

*Primary Examiner* — Ann J Lo
*Assistant Examiner* — Charles C Kuo
(74) *Attorney, Agent, or Firm* — Daniel Morris; Otterstedt & Kammer PLLC (57) ABSTRACT

Methods and apparatus are provided for memorizing data signals in a spiking neural network. For each data signal, such a method includes supplying metadata relating to the data signal to a machine learning model trained to generate an output signal, indicating a relevance class for a data signal, from input metadata for that data signal. The method includes iteratively supplying the data signal to a sub-assembly of neurons, interconnected via synaptic weights, of a spiking neural network and training the synaptic weights to memorize the data signal in the sub-assembly. The method further comprises assigning neurons of the network to the sub-assembly in dependence on the output signal of the model such that more relevant data signals are memorized by larger sub-assemblies. The data signal memorized by a sub-assembly can be subsequently recalled by activating neurons of that sub-assembly.

25 Claims, 4 Drawing Sheets

(56) References Cited

OTHER PUBLICATIONS

Khan et al., SpiNNaker: Mapping Neural Networks onto a Massively-Parallel Chip Multiprocessor, 2008 (Year: 2008).*
Lent, Richard, Resource Selection in Cognitive Networks With Spiking Neural Networks, 2018 (Year: 2018).*
Han et al., Deep Compression: Compressing Deep Neural Networks With Pruning, Trained Quantization and Huffman Coding, 2016 (Year: 2016).*
Cherubini et al., unpublished U.S. Appl. No. 16/015,897, filed Jun. 22, 2018, Managing Datasets of a Cognitive Storage System With a Spiking Neural Network, pp. 1-26 plus 5 sheets of drawings.
Merolla et al., A million spiking-neuron integrated circuit with a scalable communication network and interface, Science 345, 668 (2014), DOI: 10.1126/science.1254642, pp. 668-673.
Zenke et al., Diverse synaptic plasticity mechanisms orchestrated to form and retrieve memories in spiking neural networks, Nature Communications, 2015; Brea et al., Journal of Neuroscience, 2013 DOI: 10.1038/ncomms7922.
Neftci, et al., Synthesizing cognition in neuromorphic electronic systems, Proceedings of the National Academy of Sciences 110.37 (2013), pp. E3468-E3476. www.pnas.org/cgi/doi/10.1073/pnas.1212083110.
Brea et al., Matching Recall and Storage in Sequence Learning with Spiking Neural Networks, Journal of Neuroscience, Jun. 5, 2013 • 33(23) pp. 9565-9575.
Diehl, et al., Unsupervised learning of digit recognition using spike-timing-dependent plasticity, Frontiers in Computational Neuroscience, vol. 9, Article 99, 2015, 9 pages doi: 10.3389/fncom.2015.00099.
Johann! Brea et al: Matching recall and storage in sequence learning with spiking neural networks 11, Journal of Neuroscience, vol. 33, No. 23, Jun. 5, 2013, (Jun. 5, 2013), pp. 9565-9575.
Chaturvedi Soni et al: Ilzhikevich Model Based Pattern Classifier for Hand Written Character Recognition—A Review Analysis11, 2014 International Conference on Electronic Systems, Signal Processing and Computing Technologies, IEEE, Jan. 9, 2014 (Jan. 9, 2014), pp. 346-349.
Michael G M\ 11uller et al: "A model for structured information representation in neural networks", arxiv.org, Cornell University Library, 201 Olin Library Cornell University Ithaca, NY 14853, Nov. 11, 2016 (Nov. 11, 2016), XP081126668, abstract; Sections 1-3; figures 1-5.
Klasen, TJ. EPO as ISA. Patent Cooperation Treaty International Search Report, PCT/EP2020/070821, dated Oct. 29, 2020, 15 pages.
Related Japanese Patent Application No. 2022-502548, English translation of Office Action dated Nov. 2, 2023, p. 2.

* cited by examiner

LEARNING AND RECALL IN SPIKING NEURAL NETWORKS

BACKGROUND

The present invention relates generally to learning and recall in spiking neural networks. Methods are provided for memorizing data signals in spiking neural networks, together with apparatus and computer program products implementing such methods. Memorized data signals can be subsequently recalled by activating neurons of the network.

Spiking neural networks (SNNs) are neuromorphic processing systems inspired by biological architectures of the nervous system. In the human brain, information is processed by a complex network of neurons interconnected via synapses. A biological neuron can integrate the input signals it receives. The neuron "membrane potential", which represents the stored neuron state, is progressively modified by the arrival of neuron input signals. When the membrane potential traverses a specific voltage threshold, the neuron will "fire", generating an output signal known as an "action potential" or "spike", and then revert to its initial state. These spikes are conveyed to other neurons via synapses which change their connection strength ("plasticity" or "synaptic weight") as a result of neuronal activity.

The basic components of an SNN comprise functionality emulating neurons and synapses, with the neurons being interconnected via synapses which relay spikes between neurons in dependence on a stored synaptic weight. Information processing in SNNs relies on all-or-none spike-based communication between the network of spiking neurons.

Experimental evidence in different brain areas shows that precise spike timing can be learned and reliably reproduced over trials, providing a mechanism for memorizing and recall of information. In neuromorphic systems, learning to autonomously reproduce a spatio-temporal spike pattern representing a data signal is a fundamental challenge that has only recently been approached by models of spiking neural networks (see, for instance: "Diverse Synaptic Plasticity Mechanisms Orchestrated to Form and Retrieve Memories", Zenke et al., Nature Communications, 2015; and "Matching Recall and Storage in Sequence Learning with Spiking neural Networks", Brea et al., Journal of Neuroscience, 2013).

Improved techniques for memorizing data signals in SNNs would be highly desirable.

SUMMARY

According to one aspect of the present invention there is provided a method for memorizing data signals in a spiking neural network. For each data signal, the method includes supplying metadata relating to the data signal to a machine learning model trained to generate an output signal, indicating a relevance class for a data signal, from input metadata for that data signal. The method includes iteratively supplying the data signal to a sub-assembly of neurons, interconnected via synaptic weights, of a spiking neural network and training the synaptic weights to memorize the data signal in the sub-assembly. The method further comprises assigning neurons of the network to the sub-assembly in dependence on the output signal of the model such that more relevant data signals are memorized by larger sub-assemblies.

Methods embodying the invention implement "relevance-aware" learning in SNNs. Relevance of a data signal to be memorized is determined via a classification process, implemented by the machine learning model, based on metadata for the data signal. The SNN is dynamically configured for storing each data signal based on the output signals, and hence relevance classes, from the model so that data signals classified as more relevant are stored in larger sub-assemblies than less relevant signals. This provides an elegant and effective technique for emulating a brain-like characteristic whereby learning and recall functionality can rely on associations to improve reliability. In particular, it is common experience that learning and recall of relevant/important information is more reliable than irrelevant information. By dynamically configuring sub-assemblies based on a relevance class derived from metadata, methods embodying the invention can improve the fidelity with which data is stored and subsequently recalled in an SNN, offering highly-efficient SNN-based data storage.

Neurons may be assigned to a sub-assembly from a pool of free neurons, not assigned to any other sub-assembly, of the SNN in dependence on the model output signal. This allows a desired number of neurons to be assigned to a sub-assembly based on relevance class of the data signal to be memorized. In preferred embodiments, neurons can also be assigned to a sub-assembly from another sub-assembly, memorizing a previous data signal, in dependence on: (1) the model output signal for the current data signal to be memorized; and (2) the model output signal generated from the metadata for the previous data signal. This is implemented such that assemblies memorizing more relevant data signals retain larger numbers of neurons than those memorizing less relevant signals. In these embodiments, the SNN is reconfigurable over time. As new data signals are memorized, the evolving network can adapt to appropriately accommodate all data signals according to relevance.

In particularly efficient implementations, the machine learning model comprises a further SNN which implements the classification process. Data supplied to an SNN can be encoded in the occurrence (e.g. rate or timing) of spikes in spike signals input to the network. Preferred embodiments employ spike-frequency encoding for the metadata supplied to the further SNN, whereby data is encoded in the frequency (rate) of spikes in spike signals, and relevance class is preferably indicated by spike frequency in the output signal of the further SNN.

The data signal memorized by a sub-assembly can be recalled by activating neurons of that sub-assembly, whereby the sub-assembly outputs the memorized data signal encoded in spike signals output by the assembly. In preferred embodiments, the metadata includes a unique identifier for the data signal. The method then includes storing the unique identifier for the data signal memorized by each sub-assembly in memory associated with the SNN. This allows convenient recall of a memorized data signal in response to subsequent receipt of the identifier from the metadata input.

A further aspect of the invention provides apparatus for memorizing data signals. The apparatus comprises: a spiking neural network for receiving data signals to be memorized; a classifier implementing a machine learning model for generating an output signal, indicating a relevance class for a data signal, from input metadata relating to that data signal; and control logic adapted to implement a method as described above.

An additional aspect of the invention provides a computer program product comprising a computer readable storage medium embodying program instructions, executable by a computing apparatus, to cause the computing apparatus to perform a method described above for memorizing data signals in an SNN.

Embodiments of the invention will be described in more detail below, by way of illustrative and non-limiting example, with reference to the accompanying drawings.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
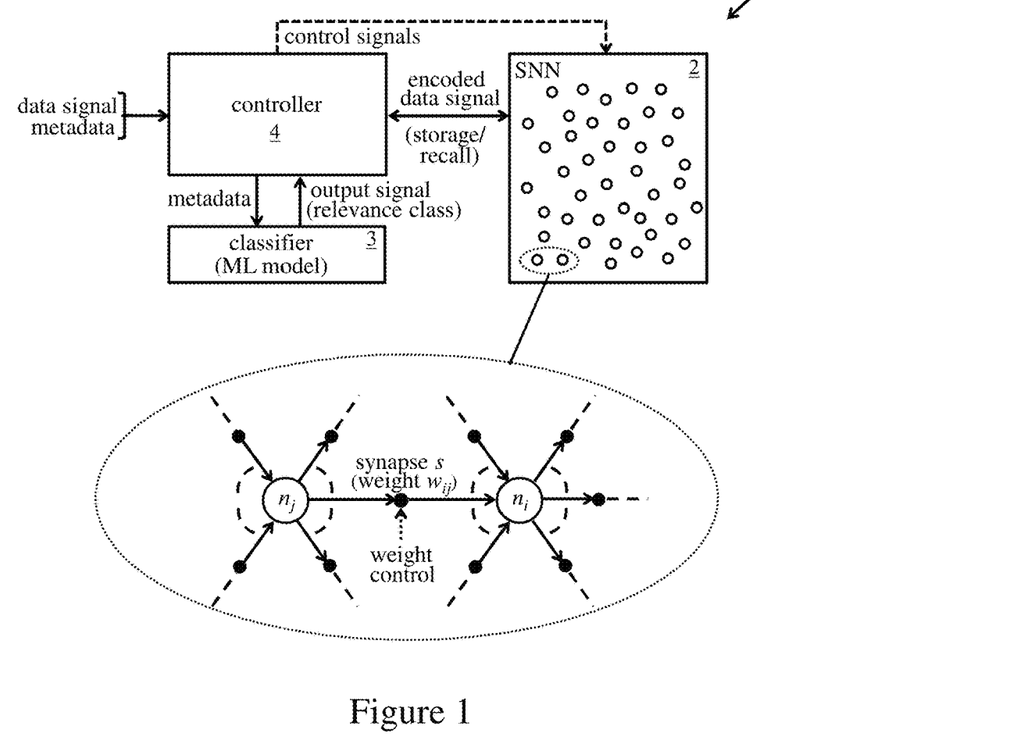
FIG. 1 is a schematic representation of apparatus for memorizing data signals according to an embodiment the invention.

FIG. 1 shows a block diagram of apparatus for memorizing data signals according to an embodiment of the invention. The apparatus 1 comprises an SNN 2 for receiving data signals to be memorized, a classifier 3 for classifying the data signals, and control logic, indicated as controller 4, for controlling operation of the apparatus. Controller 4 receives the data signals to be memorized, along with associated metadata relating to the data signals, and controls operation of SNN 2 for storage and recall of signals as detailed below.

SNN 2 comprises an assembly of spiking neurons, interconnected via synaptic weights, as illustrated schematically in the enlargement in FIG. 1. This shows a pair of neurons, $n_j$ and $n_i$, interconnected via a synapse s which relays signals from $n_j$ to $n_i$ in dependence on its stored synaptic weight $w_{ij}$. The presynaptic neuron $n_j$ accumulates input spike signals from its connected neurons in the assembly. When the neuron membrane potential traverses a firing threshold, the neuron generates an output spike and the membrane potential reverts to a resting potential. Spikes from presynaptic neuron $n_j$ are received by synapse s which relays postsynaptic signals, dependent on synaptic weight $w_{ij}$, to the post-synaptic neuron $n_i$. In particular, the synaptic connection between $n_j$ and $n_i$ causes an instantaneous change in the membrane potential of post-synaptic neuron $n_i$ after a spike is fired by pre-synaptic neuron $n_j$. The magnitude of this change reflects the synaptic weight $w_{ij}$. In operation of SNN 2, the synaptic weight $w_{ij}$ is progressively modified by neuronal activity. This "synaptic plasticity" can be implemented, for example, via an STDP (Spike Timing Dependent Plasticity) rule based on timing of pre- and/or post-synaptic neuron spikes. The weight $w_{ij}$ can also be modified during a training operation for memorizing a data signal in SNN 2 as detailed below. The synaptic weights can be modified by control signals generated by control logic of the apparatus, e.g. controller 4, during SNN operation.

Various implementations for neurons and synapses are known in the art, including circuits which exploit memristive properties of nanodevices, e.g. resistive memory cells such as phase-change memory (PCM) cells, for storing neuron membrane potential or synaptic weight. Dense crossbar arrays of such memristive devices offer massively parallel and highly area- and energy-efficient SNNs. SNN architectures can be efficiently implemented in integrated circuits as described, for example, in "A Million Spiking-Neuron Integrated Circuit with a Scalable Communication Network and Interface", Merolla et al., Science, Vol. 345, Issue 6197, 2014. Memristive devices based on resistive RAM (RRAM, or ReRAM) cells including conductive bridge RRAM cells, oxide or metal-oxide RRAM cells, and carbon RRAM cells may also be employed for neuron/synapse implementation. In general, neurons and synapses can be implemented in any desired manner, and particular functionality may be provided by hardware or software or a combination thereof. Synaptic plasticity can be implemented via various STDP schemes based on (absolute or relative) timing of at least one of input neuron and output neuron spikes. Plasticity can also depend on other variables/events in SNN operation, such as neuron membrane potentials and the output of a network optimization process during training as explained below.

Data signals input to apparatus 1 may comprise sensory input signals such as image signals, video signals and audio, e.g. voice, signals. A data signal may comprise time-independent data such as a single image or other static pattern or set of data, e.g. bytes of a data file or other dataset, or a temporal data sequence such as video/audio data representing temporal evolution of a set of data points. In general, input data signals may represent any type of data and may represent static or spatio-temporal sets of data points.

The data signals to be memorized in apparatus 1 have associated metadata which is used to classify the data signals. This metadata comprises a predetermined set of data items relating to the associated data signal, and can be conveniently expressed as a set of key:value pairs where the key identifies a particular property type and the value indicates the corresponding property value. Metadata may include various data items which describe, define, identify or otherwise relate to content and/or context of a data signal. Metadata may comprise data extracted or derived from the data signal itself, e.g. by extracting predefined fields of a data set, and/or data items defined separately for a data signal, e.g. user-defined data items.

Classifier 3 is adapted to classify a data signal based on the input metadata, supplied by controller 4, for that data signal. In particular, classifier 3 implements a machine-learning (ML) model which is (at least partially) trained to generate an output signal, indicating a relevance class for a data signal, from the input metadata for that data signal. A variety of ML models may be employed for classification here, including logistic regression, support vector machines, graph-based classification models, tree ensembles such as Random Forest models, and various neural network models. Such models can be trained to classify input data via an iterative training process in which training input data is iteratively supplied to the model and model parameters are optimized for subsequent classification of new (unseen) input data. In some embodiments, classifier 3 may be integrated in functionality of controller 4. In preferred embodiments below, classifier 3 comprises a further SNN.

Controller 4 includes functionality for encoding an input data signal into spike signals for supply to neurons of SNN 2. For example, a video data signal, representing a sequence of image frames, can be encoded as a spatio-temporal spike signal pattern in which spike signals correspond to pixels. Pixel values (e.g. grayscale values) can be encoded in the occurrence (e.g. rate or timing) of spikes in spike signals which are supplied to respective neurons of SNN 2 according to a predetermined mapping of pixels to neurons. Bits, bytes, etc., of data in any input data signal can be similarly encoded in spike signals and mapped to neurons of SNN 2. In some embodiments, controller 4 may use spike-frequency encoding whereby data values are encoded in the rate of occurrence of spikes in spike signals supplied to the SNN. In other embodiments, controller 4 may use spike-time encoding whereby data values are encoded in the time of occurrence of spikes in spike signals supplied to the SNN. Controller 4 also includes functionality controlling operation of SNN 2 for memorizing data signals, and for subsequent recall of stored data signals, as described in detail below. Suitable logic implementations for controller 4 will be apparent to those skilled in the art from the description of operation herein. The controller may, for example, comprise a microcontroller or system-on-chip, and controller functionality may be (wholly or partially) integrated in control circuitry of SNN 2. In general, functionality of controller 4 may be provided by logic implemented in hardware or software or a combination thereof. Such logic may be described in the context of computer system-executable instructions, such as program modules, executed by a (general-purpose or special-purpose) computing apparatus. Generally, program modules may include routines, programs, objects, components, logic, data structures, and so on that perform particular tasks or implement particular abstract data types.

Figure 2:
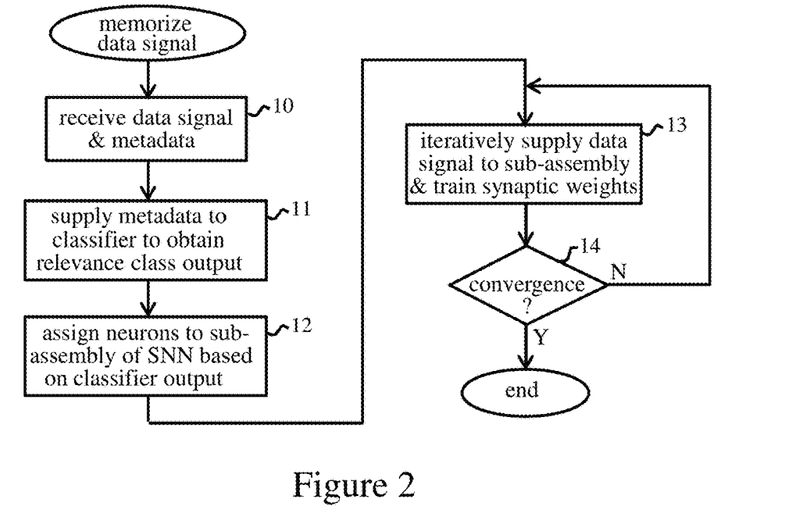
FIG. 2 indicates steps of a method implemented by the FIG. 1 apparatus.

FIG. 2 indicates steps performed by apparatus 1 to memorize an input data signal. The data signal and associated metadata are received by controller 4 in step 10. In step 11, controller 4 supplies the metadata to classifier 3 to obtain the model output signal which indicates a relevance class for the data signal. In step 12, controller 4 controls configuration in SNN 2 of a sub-assembly of neurons for memorizing the data signal. In this step, neurons are assigned to the sub-assembly in dependence on the classifier output. A higher relevance class, indicating a more relevant data signal, results in more neurons being assigned to the sub-assembly than a lower relevance class, indicating a less-relevant data signal. Neurons are assigned to a sub-assembly by activating synapses interconnecting those neurons, allowing the synaptic weights to be modified in the subsequent training process. Controller 4 thus controls SNN 2 to configure a sub-assembly of the required size and activate synaptic weights via control signals to the synapses. Controller 4 then initiates the training process to train the synaptic weights to memorize the input data signal in the sub-assembly. As indicated at step 13, the input data signal (encoded in spike signals as described above) is iteratively supplied to neurons of the newly-configured sub-assembly. In response to the input signals, the interconnected neurons of the sub-assembly generate spike signals which modify the synaptic weights as described above. The synaptic weights are also progressively modified via an iterative optimization process. For example, synaptic weights may be incrementally updated after a set of iterations in which the input signal is repeatedly supplied to the sub-assembly. As indicated by decision step 14, controller 4 periodically checks whether a predefined convergence condition, corresponding to optimized synaptic weights, has been achieved. If not ("N" at step 14), operation reverts to step 13 and training continues for a further set of iterations. Training thus continues until convergence is detected ("Y" at step 14), and operation then terminates. A representation of the input data signal is then effectively stored in the trained synaptic weights of the sub-assembly.

In step 12 of FIG. 2, neurons may be assigned to the sub-assembly from a pool of free neurons, not assigned to any other sub-assembly, of the SNN. Neurons may be connected in an all-to-all-fashion in the SNN, and a number of neurons, dependent on the relevance class output from classifier 3, can be assigned from the pool and the synapses activated to configure the assembly. In some embodiments, neurons may be interconnected via all-to-all connections only within predefined blocks for assembly formation, with less than all-to-all connectivity between blocks. Assemblies can be configured by activating synaptic connections between all or a subset of neurons in one or more blocks, based on the relevance class output, with any "unused" neurons in a block being assigned to the pool of free neurons for later assemblies. Preferred embodiments can also assign neurons of an existing sub-assembly to a new sub-assembly as detailed below. In general, connectivity in SNN 2 can be adapted as appropriate for a given application, and sub-assemblies can be configured in any desired manner such that the number of neurons in the sub-assembly increases with higher relevance of the data signal to be memorized.

The above method implements relevance-aware learning for memorizing data signals in SNN 2. Neurons are dynamically assigned to sub-assemblies such that more relevant data signals are memorized by larger sub-assemblies, improving the fidelity with which these signals are stored, and subsequently recalled, by SNN 2. A stored data signal can be recalled by controller 4 by activating neurons of the appropriate sub-assembly, whereby the sub-assembly outputs the memorized data signal as described in more detail below.

Figure 3:
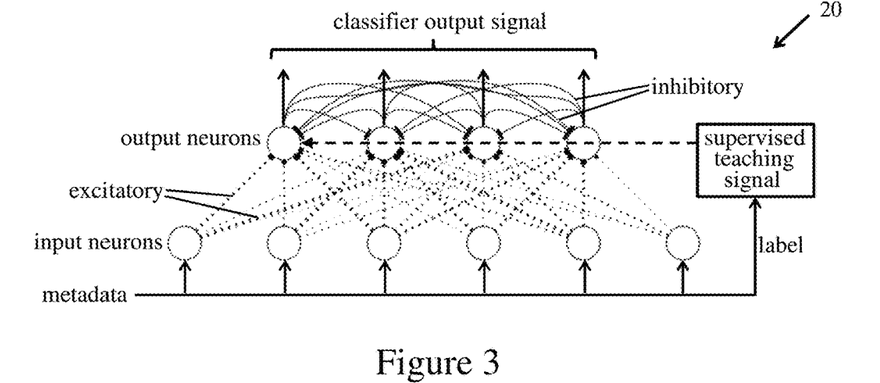
FIG. 3 shows one embodiment of a classifier of the apparatus.

In preferred embodiments, classifier 3 comprises a further SNN. FIG. 3 shows one example of an SNN-based classifier. As illustrated schematically here, the SNN 20 comprises a set of input neurons interconnected via synaptic connections with a set of output neurons. These synaptic connections, indicated by dotted lines in the figure, are excitatory connections whereby the synaptic output signals potentiate (increase the membrane potential of) the post-synaptic output neurons. The output neurons are interconnected via inhibitory synaptic connections as indicated by solid lines in the figure. In these connections, the synaptic output signals depress (decrease the membrane potential of) the post-synaptic output neurons. The input metadata, encoded in spike signals as described above, is supplied to input neurons of SNN 20. Spike signals encoding the metadata items, e.g. values expressed in key:value pairs, are mapped to input neurons, in this example via a one-to-one mapping of values to input neurons. Spike signals generated by the input neurons are relayed to output neurons via the excitatory synapses, and synaptic plasticity is implemented via a learning rule, e.g. an STDP rule, to modify synaptic weights based on neuronal activity. The output neurons generate output spike signals based on the accumulated inputs from the input neurons.

During training of SNN 20, the input metadata includes a label indicating a user-defined classification, corresponding to a relevance class, for a data signal associated with the metadata. This label is used for supervised teaching in the training phase. In particular, the label is used to generate a teaching signal which modulates the inhibitory weights of the output neuron connections such that particular output neurons (or groups of output neurons) are more active for particular classes. In this example, one output neuron is assigned to each class, and classification is performed via a "winner-takes-all" approach whereby the output neuron which fires the most indicates the class associated with the input metadata. The SNN is trained using a training dataset from which examples of metadata are successively supplied to the SNN and the synaptic weights are progressively modified, based on the associated class labels, until a desired classification accuracy is achieved. After training, new (unseen) metadata can be supplied to input neurons of the SNN. The class assigned to the associated data signal is then indicated by spike frequency in the SNN output signal, here by whichever output neuron fires the most in response to the input metadata. Classes are assigned a degree of relevance based on some user-defined relevance policy, e.g. by ordering classes from least to most relevant for the application in question. The relevance class is then used to control assembly formation for data storage as described above.

Figure 4:
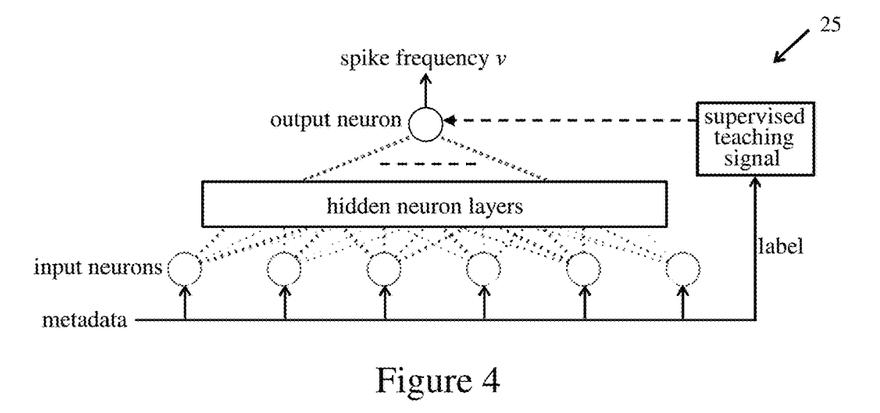
FIG. 4 shows another embodiment of the classifier.

While a simple two-layer network is shown in FIG. 3, an SNN can be configured in various ways to perform the classification operation, and may comprise additional layers of internal (hidden) neurons between the input and output neurons. A group of output neurons may be assigned to each class, with the mean activity of each group being calculated to determine the output class. FIG. 4 shows another example in which an SNN classifier 25 includes a number of hidden neuron layers and a single output neuron. Here an output class is indicated by spike frequency v of the single output neuron. Classes can be defined in the training process such that different ranges or values of the spike-frequency v map to different relevance classes, e.g. with higher values of v indicating higher relevance. Many other SNN configurations can be envisaged for performing the classification process. Also, while supervised learning is preferred, training could use an unsupervised learning process where classification is performed, without metadata labels, based on correlations in training metadata, with relevance being assigned to the resulting classifications as previously described.

Figure 5:
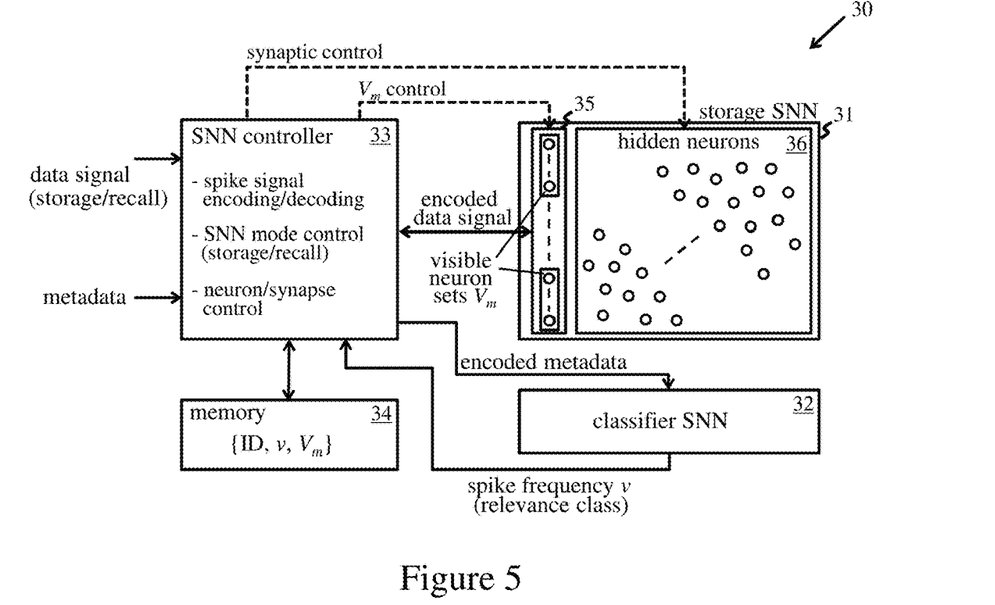
FIG. 5 shows a preferred embodiment of apparatus for memorizing data signals.

Structure and operation of a preferred embodiment will now be described in more detail. FIG. 5 is a schematic representation of the storage apparatus in this embodiment. The apparatus 30 comprises: a first, storage SNN 31; a second, classifier SNN 32; an SNN controller 33 and memory 34. Classifier SNN 32 performs data signal classification based on input metadata as described above. In this example, the classifier SNN is implemented as SNN 25 of FIG. 4, whereby spike frequency v of the output signal maps directly to relevance class for simplicity of explanation. SNN controller 33 comprises functionality for spike signal encoding of data signals and metadata supplied to SNNs 31 and 32 respectively in a storage mode, and also for decoding of spike signals output by storage SNN 31 in a recall mode. Controller 33 controls operation of storage SNN 31 in the storage and recall modes, controlling neurons/synapses of the SNN in the two modes. The controller effects selection and activation of visible neuron sets (explained below) during storage and recall via $V_m$ control signals to SNN 31, and effects synaptic control for assembly formation and training via synaptic control signals to SNN 31. Memory 34 stores data, discussed further below, used by controller 33 in the storage and recall modes.

Storage SNN 31 comprises a plurality of "visible" neurons 35, which provide the input/output interface of the SNN, and a plurality of hidden neurons 36. The visible neurons 35 comprises a plurality M of visible neuron sets, with identifiers $V_m$, m=1 to M. Visible neurons have inputs for receiving encoded data signals, and are interconnected via synaptic weights with hidden neurons 36. Hidden neurons are interconnected via synaptic weights with other hidden neurons, and hidden neurons have output synaptic connections to inputs of visible neurons 35. In this embodiment, SNN 31 provides all-to-all connectivity of visible and hidden neurons. In general, however, connectivity may range from all-to-all connectivity throughout the entire neuron assembly to partial connectivity, e.g. all-to-all connectivity between subsets of the neurons, as desired for a given application.

Figure 6:
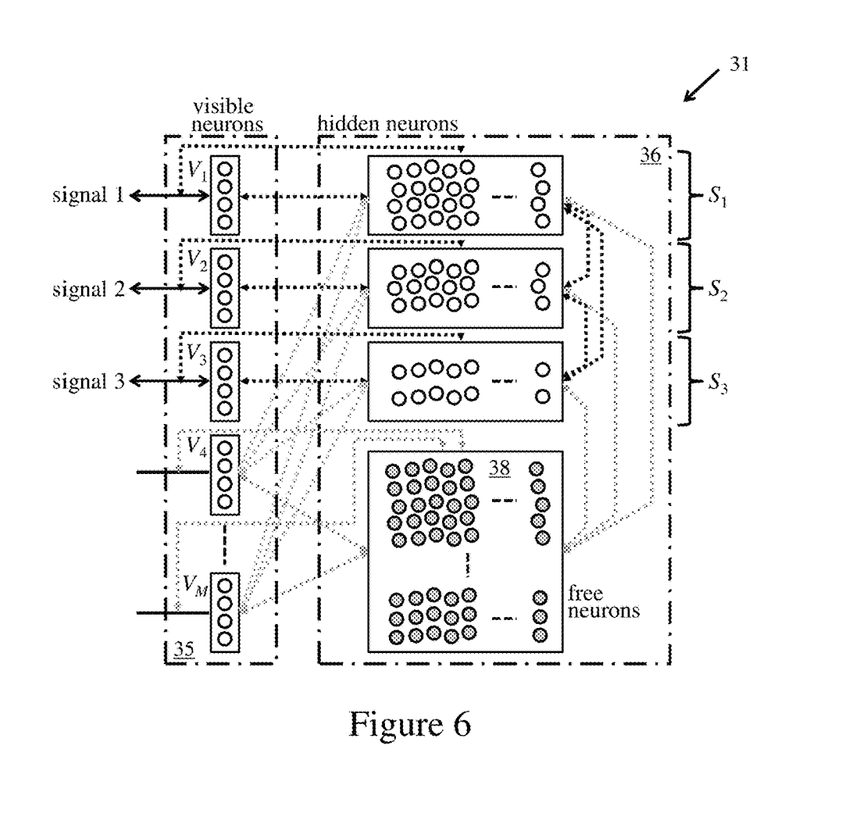
FIG. 6 illustrates a storage SNN of the FIG. 5 apparatus.

During operation, each sub-assembly configured in storage SNN comprises a set of visible neurons $V_m$ and a set of hidden neurons as illustrated schematically in FIG. 6. This shows three sub-assemblies $S_1$ to $S_3$ including corresponding sets of visible neurons $V_1$ to $V_3$ and variable numbers of hidden neurons 36. Sub-assemblies are defined by activated synaptic connections between neurons as described above. Active synaptic connections are indicated schematically by bold dotted arrows in the figure. In the state shown, SNN 31 includes additional, unused visible neuron sets $V_4$ to $V_M$, and a pool of free neurons 38 currently unassigned to any sub-assembly. Inactive synaptic connections to these neurons are indicated schematically by grey dotted arrows in the figure. Prior to activation, synaptic weights may be initialized, e.g. to zero or to random weight values.

Neurons of SNN 31 operate according to the following neuronal model. The noise-free membrane potential of neuron i is given by:

$$u_i = u_0 + \Sigma_{j=1}^N w_{ij} x_j^\epsilon(t) + x_i^\kappa(t),$$

where: $w_{ij}$ is the synaptic weight from neuron j to neuron i, $x_k^\alpha(t) = \Sigma_{s=1}^\infty \alpha(s) x_k(t-s)$ represents the convolution of spike train $x_k$ with kernel a where the postsynaptic kernel is $\epsilon(s) = (e^{-s/\tau_1} - e^{-s/\tau_2})/(\tau_1 - \tau_2)$, for s≥0, the weight adaptation kernel is $\kappa(s) = c e^{-s/\tau_2}$, for s≥0, with both kernels vanishing for s<0, and $u_0$ denotes the resting potential. Noise is modeled by stochastic spiking depending on the noise-free membrane potential u, i.e., the probability that a neuron i emits a spike at time bin t is a function ρ of its membrane potential u:

$$P(x_i(t)=1 | u_i(t)) = \rho(u_i(t)).$$

Figure 7:
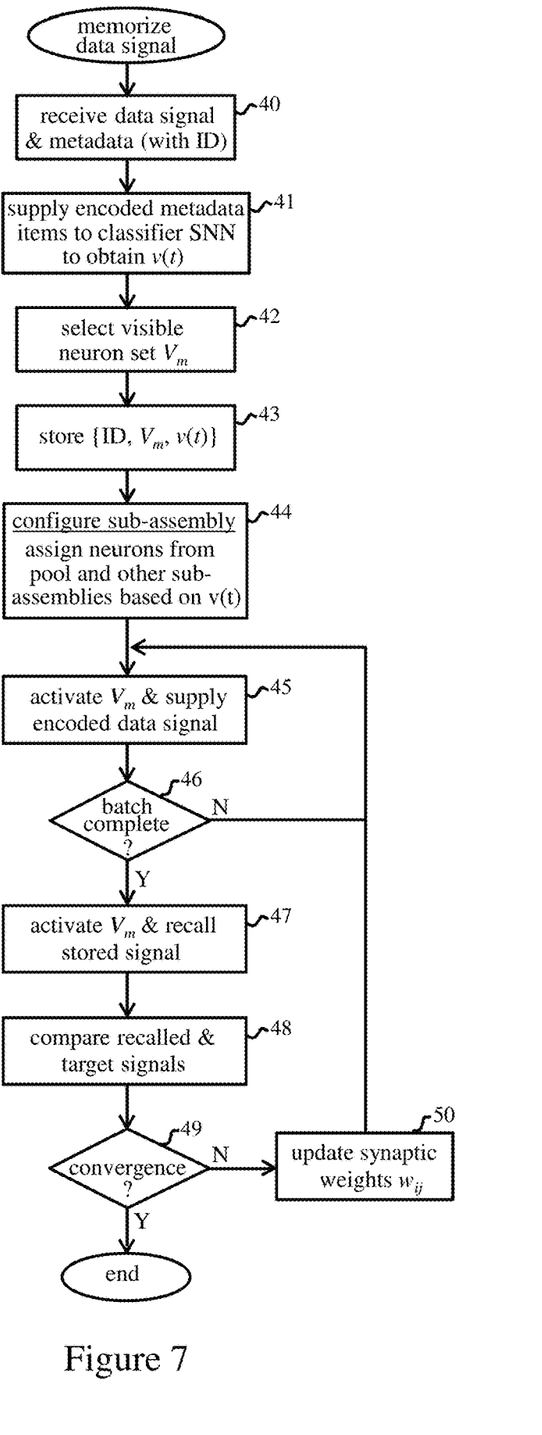
FIG. 7 indicates steps of a method implemented by the FIG. 5 apparatus.

FIG. 7 indicates steps of a method to memorize an input data signal in apparatus 30. The data signal and associated metadata are received by controller 33 in step 40. In this embodiment, controller 33 uses spike-frequency encoding for metadata supplied to classifier SNN 32. Also, the metadata in this embodiment includes (in addition to metadata items used for classification) a unique identifier (ID) for the associated data signal. In step 41, controller 33 supplies the appropriate metadata items, frequency-encoded in spike signals, to input neurons of classifier SNN 32, and receives the classifier output signal in which the current spike frequency v(t) indicates relevance class for the data signal. The classifier output v(t) at time t is used to configure a sub-assembly $S_m$ corresponding to time t. In step 42, controller 33 selects the next unused set of visible neurons $V_m$ in SNN 31 and, in step 43, stores the data tuple $\{ID; V_m; v(t)\}$ for the data signal in memory 34. In step 44, the controller assigns neurons to the sub-assembly $S_m$, providing synaptic control signals to SNN 31 to configure the sub-assembly based on the classifier output v(t). In this embodiment, hidden neurons are assigned to the sub-assembly in a probabilistic manner from hidden neurons in the pool of free neurons 38 and potentially also in another sub-assembly, memorizing a previous data signal, already configured in SNN 31. In particular, the probability that a free hidden neuron $n_i$ is assigned to a newly formed sub-assembly $S_m$ at time t is a function $\zeta_1$ of the classifier output v(t):

$$P(n_i(t) \in S_m | v(t)) = \zeta_1(v(t)).$$

The function $\zeta_1$ is selected here such that more relevant data signals are stored in larger sub-assemblies. For example, $\zeta_1$ can be selected as a monotonically increasing function of the spiking rate v(t). In addition, the probability that a hidden neuron $n_i$, member of an existing sub-assembly $S_q$, is assigned to a newly formed sub-assembly $S_m$ at time t is a function $\zeta_2$ of the current classifier output v(t) and of the classifier output $v(t_q)$ at the time $t_q$ of formation of $S_q$, ($t_q < t$):

$$P(n_i(t) \in S_m | n_i(t-1) \in S_q, v(t), v(t_q)) = \zeta_2(v(t), v(t_q)).$$

The classifier output $v(t_q)$ for a sub-assembly can be retrieved from memory 34 based on the identifier $V_m$ in the data tuple {ID; $V_m$; v(t)} for that sub-assembly. Neurons are thus probabilistically assigned to the new sub-assembly from another sub-assembly, memorizing a previous data signal, in dependence on the current spiking rate of classifier SNN 32 and the spiking rate $v(t_q)$ in the classifier output signal generated from the metadata for the previous data signal. This operation is performed such that assemblies memorizing more relevant data signals retain larger numbers of neurons than those memorizing less relevant signals. For example, the function $\zeta_2$ can be selected to: increase monotonically with v(t) and decrease monotonically with $v(t_q)$; or to increase monotonically with the difference $v(t)-v(t_q)$ where this difference is greater than zero, with $\zeta_2=0$ otherwise. The functions $\zeta_1$ and $\zeta_2$ can be constructed based on exponential, sigmoid or numerous other functions to achieve the specified objectives.

Returning to FIG. 7, in step 45 the controller initiates the training process for synaptic weights of sub-assembly $S_m$. In this embodiment, controller 33 uses spike-time encoding for data signals supplied to SNN 31. The controller activates the set of visible neurons $V_m$, causing them to spike simultaneously over several successive time periods to provide a start sequence for the data signal. The spike signals encoding the data signal are then supplied to the neurons $V_m$ whereby probabilistic spike sequences are propagated in the sub-assembly. The spike signals are iteratively supplied to neurons $V_m$ for a batch of iterations. In step 46, the controller checks if the batch has been completed and, if not, operation reverts to step 45. On completion of the batch at step 46, operation proceeds to step 47 where controller 33 activates the sub-assembly $S_m$ to recall the data signal stored thus far. Here, controller activates the visible neurons $V_m$ to generate the initial start sequence. After a period of operation, spike signals representing the stored data signal are reproduced at the inputs to visible neurons $V_m$. In step 48, the controller compares the recalled and target (i.e. original input) spike sequences for the data signal and decides, in step 49, if a convergence condition has been achieved. If not, operation proceeds to step 50 where controller 49 updates the synaptic weights of the sub-assembly in accordance with a training algorithm. Operation then reverts to step 45 for further training iterations. When convergence is detected at step 49, the trained synaptic weights are optimized for accurate storage of the data signal in sub-assembly $S_m$.

In this embodiment, training in SNN 31 involves adapting the synaptic weights $w_{ij}$ between and among the $N_v$ visible and $N_h$ hidden neurons in a sub-assembly to minimize the Kullback-Leibler (KL) divergence between the input data signal and the data signal memorized in the sub-assembly:

$$D_{KL}(P^*(v) \| P_w(v)) = \left\langle \log \frac{P^*(v)}{P_w(v)} \right\rangle_{P^*(v)},$$

where $P^*(v)$ and $P_w(v)$ denote the target distribution and the model distribution respectively of the spike trains of visible neurons $V_m$. In particular, the minimization can be carried out via a batch stochastic gradient descent approach using a learning rule which minimizes an upper bound on the KL divergence. Assuming that firing of each neuron in a sub-assembly is independent of the activity in the other neurons given the past, the probability for visible (v) and hidden (h) spike sequences can be factorized as:

$$P_w(x) = P_w(v, h) = R_w(v|h) Q_w(h|v),$$

where $$R_w(v|h) = \prod_{i=1}^{N_v} \prod_{t=1}^{T} P(v_i(t) | x(t-1), x(t-2), \cdots), \text{ and}$$

$$Q_w(h|v) = \prod_{i=1}^{N_h} \prod_{t=1}^{T} P(h_i(t) | x(t-1), x(t-2), \cdots).$$

The batch stochastic gradient descent algorithm is then expressed as:

$$\Delta w_{ij}^{batch} = \eta \sum_{t=1}^{T} \beta(x_i(t) - p_i(t)) x_j^{\varepsilon}(t) \cdot \begin{cases} 1 & \text{if } i \text{ visible} \\ (\log R_w(v|h) - \bar{r}) & \text{if } i \text{ hidden} \end{cases},$$

where $\eta$, $\beta$ and $\bar{r}$ are positive constants. Updates $\Delta w_{ij}$ to synaptic weights $w_{ij}$ are calculated accordingly in step 50 of FIG. 7.

The above embodiment provides a highly-efficient system for relevance-aware storage in SNNs. Sub-assemblies storing more relevant data signals include and retain more neurons than those storing less relevant signals, improving the fidelity with which relevant signals are memorized and also reducing the likelihood of these signals being "forgotten", thus providing improved signal recall. The dynamic configuration of sub-assemblies with neurons assigned from existing assemblies allows continued assembly formation if the free neuron pool is depleted and can additionally strengthen assemblies memorizing more relevant signals. The SNN is reconfigurable over time, allowing the network to evolve as new data signals are memorized and adapt appropriately to accommodate all data signals according to relevance. The system thus offers highly efficient allocation of storage capacity among all data signals based on relevance, with fidelity of recall being prioritized for more relevant signals. Embodiments may be envisaged where relevance class is based at least partially on expected storage duration, with higher relevance indicating longer duration. Less relevant signals, which may be "forgotten" sooner, will be retrieved earlier and can reliably be stored in smaller sub-assemblies. Reliable fidelity of recall can then be achieved for all data signals via dynamic configuration of the sub-assemblies.

Figure 8:
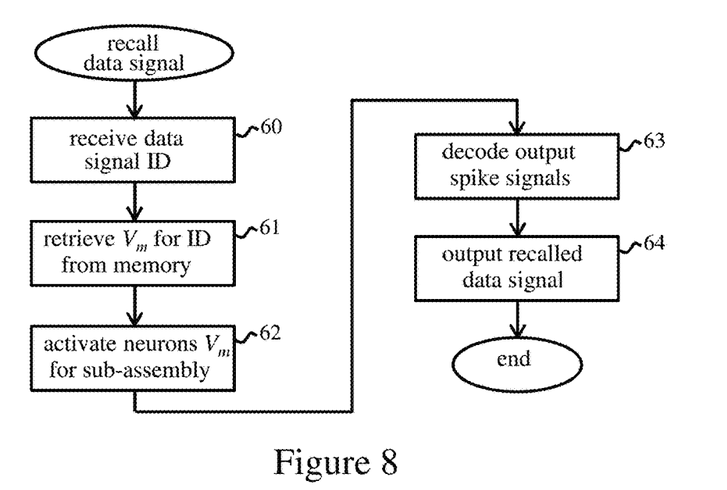
FIG. 8 indicates steps of a method for recalling data signals memorized by apparatus embodying the invention.

FIG. 8 illustrates the process of data signal recall in apparatus 30. In step 60, the unique ID for the stored data signal is supplied to controller 33. In step 61, the controller accesses memory 34 to retrieve the identifier $V_m$ in the data tuple {ID; $V_m$; v(t)} for the input ID. In step 62, controller 33 then activates the visible neurons $V_m$ for the sub-assembly generally as described for step 47 of FIG. 7. Only neurons of the required sub-assembly are active. The sub-assembly thus outputs the memorized data signal encoded in absolute timing of spike patterns in the spike signals supplied to controller 33. The controller decodes the spike signals in step 63 and outputs the recalled data signal in step 64.

During recall, the visible activity patterns of the spike signals supplied to controller 33 are distributed as $P_w(v)$. As the stochastic gradient algorithm for learning the desired pattern converges to a local minimum of the KL divergence bound, the average of the weight change during recall is zero. However, the variance of the weight change is non-zero, hence diffusion takes place and the weights drift away from the optimum settings. The time it takes to "forget" a memorized pattern is estimated as the time it takes to drift away from the achieved minimum of the KL divergence bound by more than a predetermined threshold value.

It will be seen that embodiments of the invention offer highly-efficient SNN-based storage systems using relevance aware learning for improved storage and recall of data. Such SNN-based storage systems offer significantly higher energy efficiency than conventional von-Neumann architectures, facilitating deployment in a wide range of applications including edge-computing technologies for the IoT (Internet of Things).

It will be appreciated that many changes and modifications can be made to the exemplary embodiments described above. By way of example, data/metadata can be otherwise encoded in occurrence of spikes in spike signals supplied to the SNNs. Other embodiments may employ one or a different combination of spike-time and spike-frequency encoding schemes. Relevance class may be indicated in various ways via the occurrence of spikes in the classifier output signal. The classifier output may also be converted into any signal representing relevance class for controlling assembly configuration. The classifier itself may be wholly or partially trained before starting a storage operation. Embodiments can be envisaged in which classifier training continues during assembly formation, e.g. based on labels included in the metadata for data signals stored in the SNN. Other neuron models and training schemes may also be employed for neuron implementation and SNN training.

In general, where features are described herein with reference to a method embodying the invention, corresponding features may be provided in apparatus/computer program products embodying the invention, and vice versa. Steps of flow diagrams may be performed in a different order to that shown, and some steps may be performed concurrently as appropriate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for memorizing data signals in a spiking neural network, the method comprising, for each data signal:
   supplying metadata relating to the data signal to a machine learning model trained to generate an output signal, indicating a relevance class for a data signal, from input metadata for that data signal;
   iteratively supplying the data signal to a sub-assembly of neurons, interconnected via synaptic weights, of a spiking neural network and training said synaptic weights to memorize the data signal in said sub-assembly; and
   assigning neurons of said network to the sub-assembly based on the relevance class via a dependence on the output signal of said model such that more relevant data signals are memorized by larger sub-assemblies.

2. The method as claimed in claim 1 wherein said model comprises a further spiking neural network.

3. The method as claimed in claim 1 wherein neurons are assigned to said sub-assembly from a pool of free neurons, not assigned to any other sub-assembly, of said network in dependence on the output signal of said model.

4. The method as claimed in claim 3 including assigning neurons to said sub-assembly from another sub-assembly, memorizing a previous data signal, based on the relevance class via dependence on the output signal of said model and the output signal generated by the model from the metadata for the previous data signal such that assemblies memorizing more relevant data signals retain larger numbers of neurons.

5. The method as claimed in claim 1 wherein neurons are assigned to said sub-assembly in a probabilistic manner.

6. The method as claimed in claim 1 wherein:
   said sub-assembly comprises a set of visible neurons and a set of hidden neurons;
   the input data signal is iteratively supplied to the set of visible neurons; and
   neurons assigned to the sub-assembly are assigned to the set of hidden neurons.

7. The method as claimed in claim 1 wherein:
   said model comprises a further spiking neural network;
   said metadata is encoded via spike-frequency encoding in spike signals supplied to said further network; and
   said relevance class is indicated by spike frequency in the output signal of the further network.

8. The method as claimed in claim 1 including training said synaptic weights via a learning rule which minimizes an upper bound on the Kullback-Leibler divergence between the input data signal and the data signal memorized in said sub-assembly.

9. The method as claimed in claim 1, the method further comprising recalling the data signal memorized by a sub-assembly by activating neurons of that sub-assembly, whereby the sub-assembly outputs the memorized data signal.

10. The method as claimed in claim 1 wherein said metadata includes a unique identifier for the data signal, and wherein the method includes:
   storing, in memory associated with said network, the unique identifier for the data signal memorized by the sub-assembly; and
   in response to subsequent receipt of said unique identifier, recalling the memorized data signal by activating neurons of the sub-assembly whereby the sub-assembly outputs the memorized data signal.

11. An apparatus for memorizing data signals, the apparatus comprising
   a spiking neural network for receiving data signals to be memorized,
   a classifier implementing a machine learning model for generating an output signal, indicating a relevance class for a data signal, from input metadata relating to that data signal, and
   control logic adapted, for each data signal, to:
      supply said metadata for the data signal to the classifier to obtain said output signal indicating a relevance class for the data signal;
      iteratively supply the data signal to a sub-assembly of neurons, interconnected via synaptic weights, of the spiking neural network and train said synaptic weights to memorize the data signal in said sub-assembly; and
      assign neurons of said network to the sub-assembly based on the relevance class via a dependence on said output signal of the classifier such that more relevant data signals are memorized by larger sub-assemblies.

12. The apparatus as claimed in claim 11 wherein said machine learning model comprises a further spiking neural network.

13. The apparatus as claimed in claim 11 wherein the control logic is adapted to assign neurons to said sub-assembly from a pool of free neurons, not assigned to any other sub-assembly, of said network in dependence on said output signal of the classifier.

14. The apparatus as claimed in claim 13 wherein the control logic is adapted to assign neurons to said sub-assembly from another sub-assembly, memorizing a previous data signal, based on the relevance class via a dependence on said output signal of the classifier and the output signal generated by the classifier from the metadata for the previous data signal such that assemblies memorizing more relevant data signals retain larger numbers of neurons.

15. The apparatus as claimed in claim 11 wherein the control logic is adapted to assign neurons to said sub-assembly in a probabilistic manner.

16. The apparatus as claimed in claim 11 wherein said sub-assembly comprises a set of visible neurons and a set of hidden neurons, and wherein the control logic is adapted to iteratively supply the data signal to the set of visible neurons and to assign neurons to the set of hidden neurons.

17. The apparatus as claimed in claim 11 wherein:
said machine learning model comprises a further spiking neural network;
the control logic is adapted to encode said metadata via spike-frequency encoding in spike signals supplied to the classifier; and
said relevance class is indicated by spike frequency in the output signal of the classifier.

18. The apparatus as claimed in claim 11 wherein the control logic is adapted to train said synaptic weights via a learning rule which minimizes an upper bound on the Kullback-Leibler divergence between the input data signal and the data signal memorized in said sub-assembly.

19. The apparatus as claimed in claim 11 wherein the control logic is further adapted to recall the data signal memorized by a sub-assembly by activating neurons of that sub-assembly, whereby the sub-assembly outputs the memorized data signal.

20. The apparatus as claimed in claim 11 wherein said metadata includes a unique identifier for the data signal, and wherein the control logic is further adapted to:
store, in memory of the apparatus, the unique identifier for the data signal memorized by the sub-assembly; and
in response to subsequent receipt of said unique identifier, to recall the memorized data signal by activating neurons of the sub-assembly whereby the sub-assembly outputs the memorized data signal.

21. A computer program product for memorizing data signals in a spiking neural network, said computer program product comprising a computer readable storage medium having program instructions embodied therein, the program instructions being executable by a computing apparatus to cause the computing apparatus, for each data signal, to:
supply metadata relating to the data signal to a machine learning model trained to generate an output signal, indicating a relevance class for a data signal, from input metadata for that data signal;
iteratively supply the data signal to a sub-assembly of neurons, interconnected via synaptic weights, of a spiking neural network and train said synaptic weights to memorize the data signal in said sub-assembly; and
assign neurons of said network to the sub-assembly based on the relevance class via a dependence on the output signal of said model such that more relevant data signals are memorized by larger sub-assemblies.

22. The computer program product as claimed in claim 21 wherein said model comprises a further spiking neural network.

23. The computer program product as claimed in claim 21, said program instructions being executable such that neurons are assigned to said sub-assembly from a pool of free neurons, not assigned to any other sub-assembly, of said network in dependence on the output signal of said model.

24. The computer program product as claimed in claim 23, said program instructions being further executable to assign neurons to said sub-assembly from another sub-assembly, memorizing a previous data signal, based on the relevance class via a dependence on the output signal of said model and the output signal generated by the model from the metadata for the previous data signal such that assemblies memorizing more relevant data signals retain larger numbers of neurons.

25. The computer program product as claimed in claim 21, said program instructions being further executable to recall the data signal memorized by a sub-assembly by activating neurons of that sub-assembly, whereby the sub-assembly outputs the memorized data signal.

* * * * *